July 1, 1930.  J. W. SMALL  1,769,043
ATOMIZING LUBRICATOR
Filed Sept. 17, 1927  2 Sheets-Sheet 1

Witness:
William P. Kilroy

Inventor
John W. Small
By George I. Haight
His Attys

July 1, 1930.  J. W. SMALL  1,769,043
ATOMIZING LUBRICATOR
Filed Sept. 17, 1927  2 Sheets-Sheet 2

Witness:
William P. Kilroy

Inventor
John W. Small
By George J. Haight
His Attys

Patented July 1, 1930

1,769,043

UNITED STATES PATENT OFFICE

JOHN W. SMALL, OF RICHMOND, VIRGINIA

ATOMIZING LUBRICATOR

Application filed September 17, 1927. Serial No. 220,091.

This invention relates to improvements in atomizing lubricators.

In the operation of steam locomotives, great difficulty has heretofore been experienced in obtaining economical and complete lubrication of the cylinders and valve chambers. The means commonly heretofore employed, consists of a so-called lubricator or oil pump generally operated from a crosshead of the locomotive which forces the oil under pressure to a number of check valve-controlled nozzles, from which the individual oil pipes lead to the several cylinders and valve chambers. With such former arrangements, the oil is admitted to the parts to be lubricated in drops, with the result that the oil is not uniformly distributed over the relatively movable parts. Increasing the oil supply in such former devices does not fully overcome the difficulty of lack of uniform distribution and furthermore, increases the amount of lubricant required with consequent increased cost of maintenance.

On object of my invention is to provide lubricating means, more particularly adapted for locomotives, but not limited thereto, whereby the oil or lubricant is supplied to the parts to be lubricated in a very finely atomized condition thoroughly intermingled with steam which is supplied to the parts to be lubricated in a fine film to all of the surfaces of the relatively moving parts and with a minimum amount of lubricant required.

A specific object of my invention is to provide a lubricator of the character indicated in the preceding paragraph, characterized by the fact that the lubrication is maintained to the cylinders and valve chambers whether the locomotive is running under power or is drifting.

Other objects of the invention will more clearly appear from the description and claims appearing hereinafter.

Figure 1:
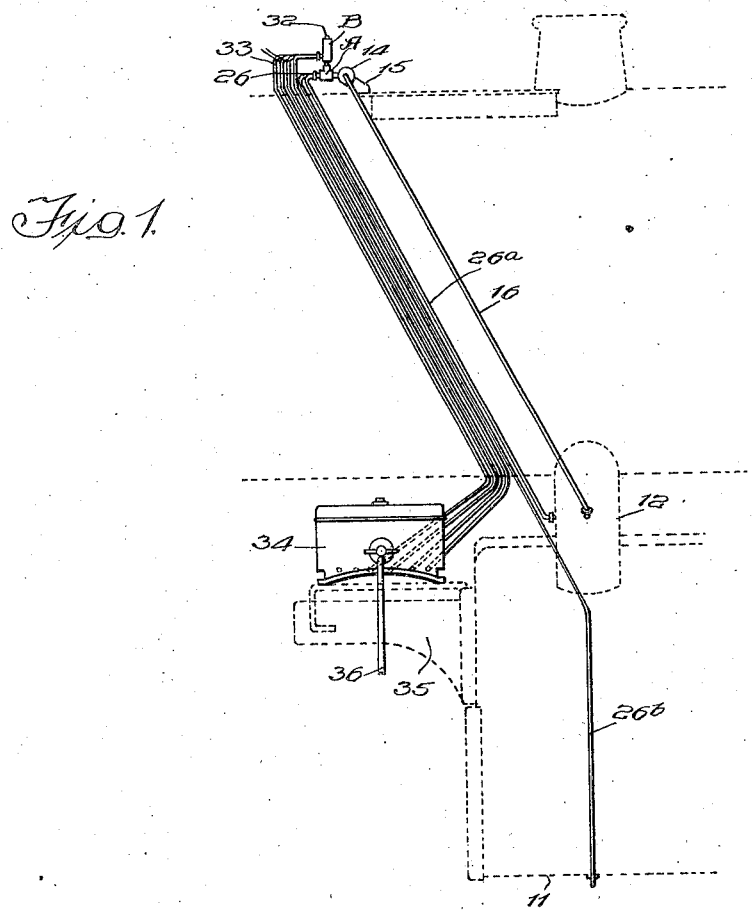
Figure 4:
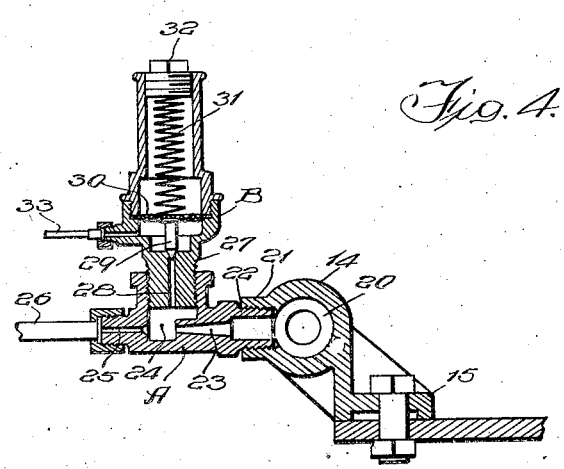
Figure 2:
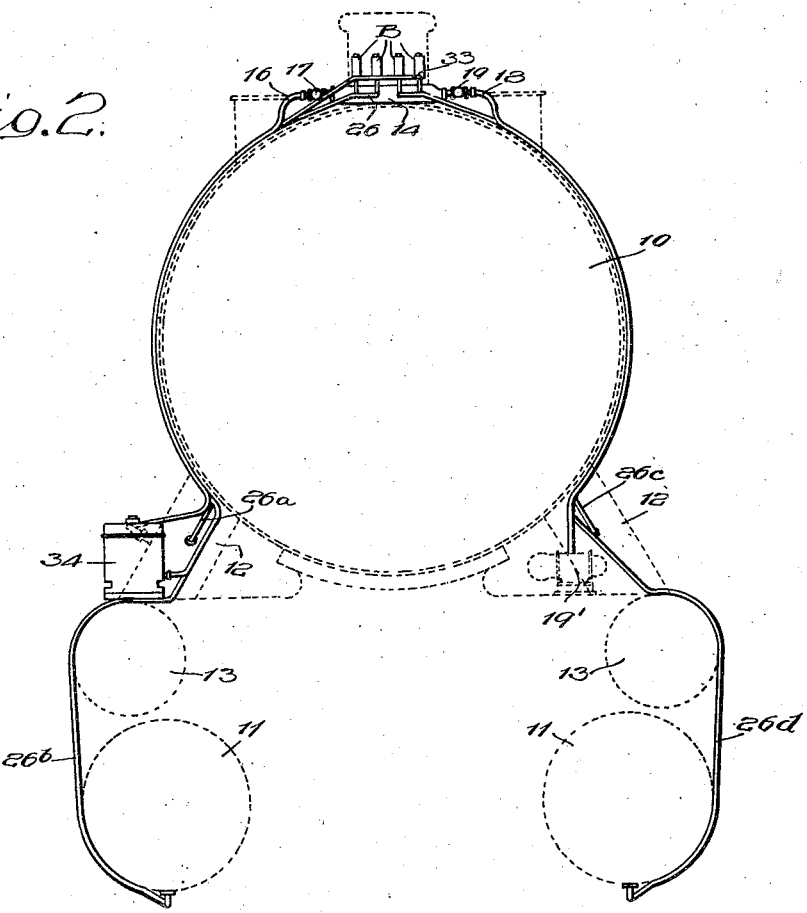
Figure 3:
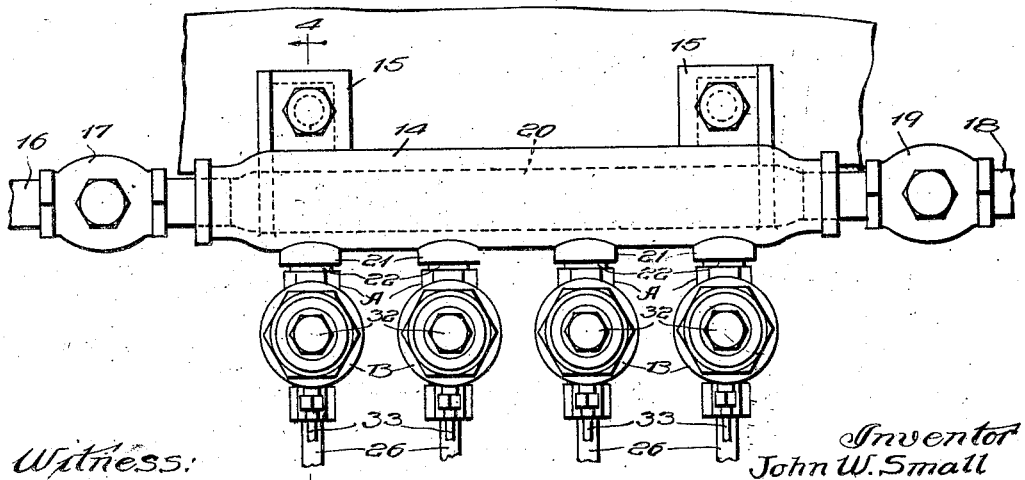

In the drawings forming a part of this specification, Figure 1 is a more or less diagrammatic view of a portion of one side of a locomotive, showing my improvements as applied thereto. In this figure, the lubricating arrangement is indicated in full lines and portions of the locomotive in dotted lines. Figure 2 is a front end view of a locomotive showing my improvements applied thereto, the same scheme of showing the lubricating arrangement in full lines and the parts of the locomotive in dotted lines, being followed. Figure 3 is a top plan view, upon an enlarged scale, of the manifold or distributor of the improved lubricating arrangement. And Figure 4 is a sectional view corresponding to the section line 4—4 of Figure 3.

In said drawing, the front end of the boiler of the locomotive is indicated at 10, the two cylinders at 11—11, the two steam pipes at 12—12, through which the steam is supplied to the steam chest or valve chambers 13—13 and delivered from the latter to the cylinders as will be understood.

In carrying out my invention, I employ a manifold 14, which is preferably secured to the top of the locomotive boiler rearwardly of the smoke stack as indicated in Figure 1, the same being attached by any suitable means as by the lugs 15—15 formed integral therewith and by which the same may be bolted to any suitable supporting fixed part of the locomotive. Superheated steam is supplied to one end of the manifold 14, the lefthand end as viewed in Figure 3, through a pipe 16 which is in communication with the steam pipe 12 on one side of the locomotive as indicated in Figures 1 and 2. The superheated steam so admitted to the manifold is passed through a check valve 17, which may be of any suitable or well known form. When the locomotive is drifting, steam is supplied to the manifold 14 through the pipe 18 to the righthand end of the manifold as viewed in Figure 3, said pipe 18 being in communication with the drifting valve 19' located on the opposite side of the locomotive as indicated in Figure 2. The saturated steam adapted to be thus delivered from the drifting valve through the pipe 18 is also passed through a check valve 19 at the righthand end of the manifold as viewed in Figure 3.

When the locomotive is running under steam, the superheated dry steam will be supplied through the pipe 16 and passage of the steam to the pipe 18 will be prevented by the check valve 19. When the locomotive is drifting, saturated steam will be supplied to the manifold through the pipe 18 and its passage to the pipe 16 will be prevented by the check valve 17, as will be understood.

The manifold 14, as best shown in Figure 4, is provided on the interior thereof with an elongated main chamber 20. The manifold 14 is provided with a plurality of interiorly threaded, laterally extended pipe connecting sections 21, the number of these corresponding to the number of parts of the locomotive to be lubricated. In the particular embodiment illustrated in the drawings, four are used, the arrangement being such as to supply the atomized lubricant to each of the two cylinders and to each of the steam chests or valve chambers.

Threaded into each of the thread sections 21 is a member which may be generally designated as a nozzle A, the details of one of which are indicated in Figure 4. Each of said nozzles A has a threaded nipple end 22, by which it is attached to the manifold. On its interior, each nozzle A is provided with a nozzle or ejector passage 23 in communication with the chamber 20 of the manifold, and the small end of which is adapted to deliver the steam in a jet to the chamber 24 of the nozzle A. Opposite the ejector passage 23 is the delivery opening or passage 25, through which the atomized lubricant and steam intermingled therewith is delivered to the delivery pipe 26. One of said delivery pipes 26ª leads to the steam supply pipe 12 as shown in Figure 1; another delivery pipe 26ᵇ leads to the underside of the cylinder 11 on the same side of the locomotive as shown in Figure 1; a third pipe 26ᶜ leads to the steam supply pipe 12 on the opposite side of the locomotive; and the fourth pipe 26ᵈ leads to the underside of the cylinder 11 on the last mentioned side of the locomotive.

Each of the nozzles A is further provided with a lubricant supply and check valve designated generally by the reference character B. This may be of any suitable or well known form and, as illustrated, comprises a base member 27 having a passage 28 communicating with the chamber 24. The upper end of the passage 28 is adapted to be closed by a needle valve 29 which is attached to a flexible diaphragm 30 normally yieldingly held down by a spring 31, the tension of which may be adjusted by the adjusting nut 32.

The oil or lubricant delivered to each of the check valves B, through a pipe 33 to the underside of the diaphragm 30, there being one such pipe 33 for each check valve B, all of said pipes 33 being supplied by the lubricant from the force feed lubricator 34. The latter may be of any well known form and is indicated conventionally in the drawing. It is preferably mounted on a suitable bracket 35 adjacent the valve chamber and the pump thereof will ordinarily be operated by a lever 36 suitably connected to a moving part of the locomotive as, for instance, the cross-head. The spring 31 pressing on the diaphragm 30 holds the valve closed when the pump is not operating, the spring being so adjusted that when the pump is operating and forces the lubricant into the chamber below the diaphragm 30, the pressure created in the chamber will bulge the diaphragm upwardly against the action of the spring and raise the valve 29, opening the port or passage 28 and permitting the lubricant to flow therethrough.

With the arrangement above described, it is evident that the chamber 20 of the manifold will always be supplied with steam under pressure, either the super-heated dry steam or saturated steam. The oil will be supplied to each of the nozzles in the manner indicated in the preceding description and as the oil or lubricant enters the chamber 24 of each nozzle in drops, the jet of steam will thoroughly atomize the lubricant in the chamber 24 and the atomized lubricant and steam thoroughly intermingled will thus be supplied to the several parts of the locomotive. In this manner, the lubricant is supplied to the cylinders and valve chambers in such manner that the lubricant is applied to all the surfaces capable of being reached by the steam so that there is a uniform distribution of the lubricant over all of the surfaces requiring lubrication. Actual practice has demonstrated that a much more efficient lubrication is obtained than heretofore and further, that a much less quantity of the lubricant is required. It will further be observed that the lubrication takes effect whether the locomotive is under power or merely drifting.

Although I have herein shown and described what I now consider the preferred manner of carrying out the invention and as specifically applied to a locomotive, it is to be understood that the specific embodiment disclosed is by way of illustration only and not by way of limitation, all changes and modifications coming within the appended claims being contemplated.

I claim:—

1. In a lubricator for locomotives, the combination with a manifold; of means for supplying steam to said manifold from the locomotive when the latter is running under power; separate means for supplying steam to said manifold when the locomotive is drifting; a plurality of nozzles attached to said manifold and each having an atomizing chamber therein in communication with the manifold; means for supplying lubricant individually to each of said nozzle chambers; and a delivery pipe for each of said nozzles to respective parts of the locomotive to be lubricated.

2. In a lubricator for locomotives, the combination with a nozzle having an atomizing chamber; of means for supplying steam from the locomotive to said chamber when the locomotive is running under power; separate means for supplying steam to said chamber when the locomotive is drifting; means for supplying lubricant to said atomizing chamber; and means for delivering atomized lubricant intermingled with steam from said atomizing chamber to the locomotive parts to be lubricated.

3. In a lubricator for locomotives, the combination with a manifold; of means for supplying steam under pressure from the locomotive thereto when the locomotive is running under power; separate means for supplying steam to said manifold when the locomotive is drifting; a plurality of nozzles attached to and having atomizing chambers in communication with said manifold; a force feed lubricator operated from a moving part of the locomotive; means for delivering lubricant from said force feed lubricator to each of said nozzle chambers, each said means having included therein a check valve; and means for delivering intermingled atomized lubricant and steam from said nozzle chambers to the locomotive parts to be lubricated.

4. In a lubricating device for an engine, the combination with an atomizing chamber; of a nozzle communicating with said chamber; means for constantly supplying steam under pressure to said nozzle while the steam is being supplied to the engine; a source of lubricant supply communicating with said chamber for supplying lubricant under pressure; valve means for controlling the flow of lubricant to said chamber, including a valve port through which said lubricant passes, a needle valve cooperating with said port, and a spring pressed diaphragm for actuating said needle valve, said diaphragm being operated by the pressure of the lubricant only, subject to the action of the spring pressure to open and close said valve; and means for conveying the intermingled atomized lubricant and steam to the parts to be lubricated.

5. In a lubricator for an engine cylinder, the combination with a nozzle having a chamber and a steam ejector passage leading to said chamber, said nozzle having a delivery opening in line with the ejector passage; of means for constantly supplying steam to and through said passage to the chamber while steam is being supplied to the engine cylinder; means for supplying lubricant under pressure including a check valve for controlling the supply of lubricant to said chamber, said valve being opened and closed responsive to the pressure of the lubricant only, subject to the action of the spring pressure; means for yieldingly pressing said check controlling valve to closed position; and means for adjusting the pressure exerted by said last named means.

6. In a lubricating device for a cylinder and valve chamber of a locomotive engine, the combination with a pair of nozzles each having an atomizing chamber; of means for supplying lubricant under pressure to said chambers from a common source of supply, including a separate supply line communicating with each chamber and both communicating with the source of supply under pressure; means for supplying steam under pressure simultaneously to both chambers, including a supply line communicating with each chamber and both communicating with the source of steam supply under pressure, each of said nozzles having a steam supply inlet communicating with the chamber thereof and an outlet through which the steam mingled with the atomized lubricant is ejected, said inlet and outlet being in alinement and spaced apart, each chamber also having an inlet through which the lubricant is admitted, said last named inlet being located at one side of the chamber between the first named inlet and the outlet of the chamber, the outlet of one of said chambers being in communication with the engine cylinder and the outlet of the other chamber being in communication with the valve chamber of the engine.

7. In a lubricator for a locomotive engine, the combination with a nozzle having a chamber and a steam ejector passage leading to the chamber and having an outlet within the chamber, said chamber being in constant communication with the steam supply by means of said passage, while steam is being supplied to the engine to operate the same, said nozzle having a delivery opening spaced from said outlet of the ejector passage and in alinement with the ejector passage and outlet thereof; and means for supplying lubricant under pressure to said chamber between the outlet of the ejector passage and the delivery opening of said chamber, said last named means including a port and a cooperating valve mechanism, said port communicating with the chamber at one side thereof between the outlet of the ejector passage and the delivery opening, and said valve mechanism being operated responsive to the pressure of the lubricant for opening and closing said port.

8. In a lubricator for locomotive engines, the combination with a manifold; of means for constantly supplying steam to said manifold from the locomotive while steam is being supplied to the cylinder of the engine thereof; a plurality of nozzles attached to and having atomizing chambers in continuous communication with said manifold; a forced feed lubricator operated from a moving part of the locomotive; means for delivering lubricant from said forced feed lubricator to each of said nozzle chambers, each of said means having included therein a check valve; and means for delivering intermingled atomized lubricant and steam from said nozzle chambers to the locomotive parts to be lubricated.

In witness that I claim the foregoing I have hereunto subscribed my name this twelfth day of September, 1927.

JOHN W. SMALL.